(No Model.)
J. H. CULVER.
TIME AND LONGITUDE INDICATOR.
No. 357,117. Patented Feb. 1, 1887.
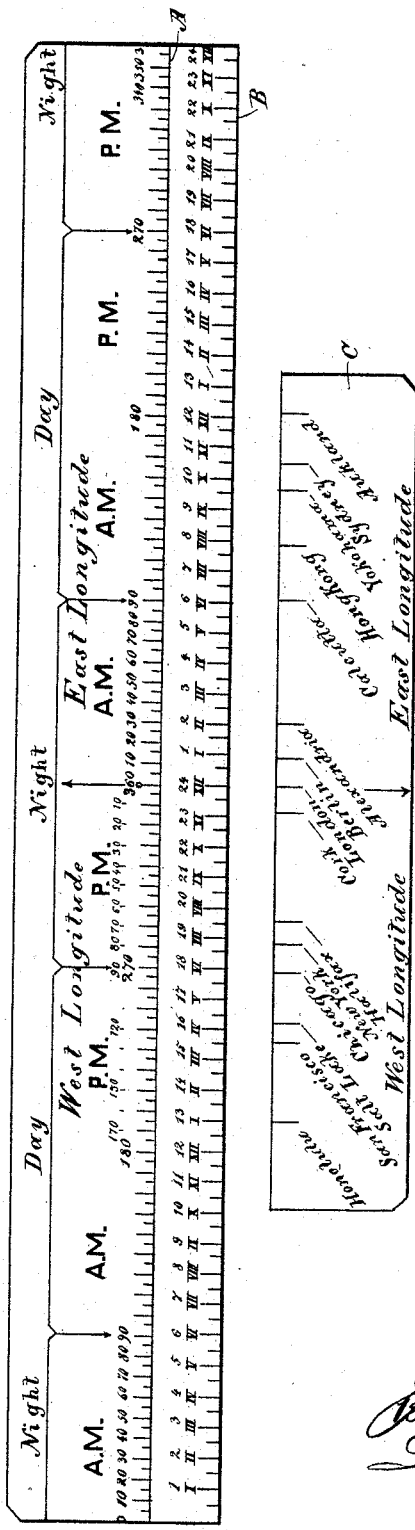
Witnesses,
Geo. H. Strong.
Inventor,
Jas. H. Culver
By Dewey & Co.
Attys

UNITED STATES PATENT OFFICE.

JAMES H. CULVER, OF SAN FRANCISCO, CALIFORNIA.

TIME AND LONGITUDE INDICATOR.

SPECIFICATION forming part of Letters Patent No. 357,117, dated February 1, 1887.

Application filed April 20, 1886. Serial No. 199,565. (No model.)

*To all whom it may concern:*

Be it known that I, JAMES H. CULVER, of the city and county of San Francisco, State of California, have invented an Improvement in Time and Longitude Indicators; and I hereby declare the following to be a full, clear, and exact description of the same.

My invention relates to a device for indicating the relative time and longitude of different places.

It consists of a scale or scales constructed in a manner I will hereinafter fully describe and claim.

The figure is a plan view representing a scale embodying my invention.

In the figure I have shown two scales made straight. They may be made of metal, wood, paper, or other suitable material, and the scale A, upon which the degrees and divisions of time are printed, is made to contain two complete divisions of three hundred and sixty degrees, the first commencing at the left end with 0 and ending at the center with 360°. The divisions of time commence at the same point at the left end, with twelve o'clock midnight, and end with twelve o'clock midnight, twenty-four hours later, at the center. The degrees commence again at 0 at the center and end with 360° at the right end of the scale, and the time divisions in like manner begin with midnight at the same point and terminate with midnight, twenty-four hours later, at the right end.

The second or movable scale C is one-half as long as the first-described one, and has the names of places printed upon it at points which indicate their relative longitude, and it will be manifest that by moving this scale over the first one the relative time and longitude may be ascertained in the same manner as with the circular scale.

Having thus described my invention, what I claim as new, and desire to secure by Letters Patent, is—

A straight scale having two complete divisions of time or longitude marked upon it, in combination with a similar scale bearing the names of places, and having lines extending from the edge corresponding with the names, and at points indicating their relative longitude, substantially as herein described.

In witness whereof I have hereunto set my hand.

JAMES H. CULVER.

Witnesses:
  S. H. NOURSE,
  H. C. LEE.